United States Patent [19]
Okazaki et al.

[11] Patent Number: 5,103,931
[45] Date of Patent: Apr. 14, 1992

[54] EXHAUST SILENCING MEANS FOR MARINE PROPULSION

[75] Inventors: Masaki Okazaki; Hiroaki Fujimoto, both of Hamamatsu, Japan

[73] Assignee: Sanshin Industries Co., Ltd., Hamamatsu, Japan

[21] Appl. No.: 577,071

[22] Filed: Aug. 31, 1990

Related U.S. Application Data

[63] Continuation of Ser. No. 221,324, Jul. 19, 1988, abandoned.

[30] Foreign Application Priority Data

Jul. 20, 1987 [JP] Japan ............................ 62-179165

[51] Int. Cl.$^5$ ............................................. F01N 1/16
[52] U.S. Cl. ................................. 181/271; 181/235; 60/314; 60/317; 440/89
[58] Field of Search ............... 181/226–228, 181/233, 235, 240, 246, 250, 259, 260, 271–273, 276; 440/52, 76, 89, 900; 55/DIG. 30; 60/314, 317

[56] References Cited

U.S. PATENT DOCUMENTS

| 1,975,861 | 10/1934 | Oldberg | 181/250 |
| 2,875,787 | 3/1959 | Evans | 181/233 X |
| 4,607,723 | 8/1986 | Okazaki | 181/273 X |
| 4,723,926 | 2/1988 | Uehara | 440/52 |

FOREIGN PATENT DOCUMENTS 2402767  5/1979  France ........................ 181/278

Primary Examiner—Brian W. Brown
Attorney, Agent, or Firm—Ernest A. Beutler

[57] ABSTRACT

A number of embodiments of internal combustion engine exhaust systems each of which is effective to provide good silencing for exhaust gases through the use of an elastic diaphragm that dampens pulsations. In some embodiments, this elastic diaphragm forms a portion of a Helmholz resonator and in some the diaphragm is cooled by submerging in a cooling jacket of the engine or its exhaust system or by means of cooling air fins. Also, various arrangements are incorporated for adjusting or tuning the rigidity of the diaphragm. Furthermore, in some embodiment the diaphragm is suspended in such a way as to act as a vibration damping member between mechanical components of the exhaust system.

9 Claims, 6 Drawing Sheets 5,103,931

EXHAUST SILENCING MEANS FOR MARINE PROPULSION

This is a continuation of U.S. patent application Ser. No. 221,324, filed July 19, 1988 now abandoned.

BACKGROUND OF THE INVENTION

This invention relates to an exhaust silencing means for marine propulsion more particularly to an improved silencing system for an internal combustion engine.

As is well known, it is desirable if not necessary to silence the exhaust gases issuing from the exhaust ports of an internal combustion engine before they are discharged to the atmosphere. A wide variety of devices have been proposed for silencing the exhaust gases. To a large extent, the noises of the exhaust gases result from the pulsations which occur in the exhaust system due to the opening and closing of the exhaust ports. It has been proposed to silence the exhaust gases by providing a variable volume chamber that communicates with the exhaust passage and in which a floating piston is supported so as to dampen these pulsations. However, the device of this type previously proposed has not been fully effective. One of the main reasons for this is that the exhaust gases may freely pass through the floating piston and as a result the damping operation of the piston is not particularly effective.

It is, therefore, a principle object to this invention to provide an improved arrangement for silencing the exhaust gases of an internal combustion engine by utilizing a variable volume chamber than communicates with the exhaust system and which is defined at least in part by a flexible diaphragm so as to improve the silencing efficiency.

In conjunction with outboards motors, a common application of internal combustion engines, the problem of exhaust silencing is particularly acute. The reason for this is that the outboard motor and its contained exhaust system must be extremely compact. Therefore, a wide variety of exhaust silencing devices that are effective in other applications simply cannot be used to any practical extent in such an application.

In addition to the size problem, the outboard motors normally utilize a below the water exhaust gas discharge for assisting the silencing of the exhaust gases under high speed operation. However, the back pressure of such under water exhaust systems is to high in conjunction with low speed operation and hence it has also been proposed to employ above the water exhaust. For the most part, the above the water exhaust system is completely independent of and uses different silencing devices for the exhaust gases than the underwater exhaust gas discharge.

It is, therefore, a still further object of this invention to provide an improved exhaust silencing device for an outboard motor.

It is a further object of this invention to provide an improved exhaust silencing device for an outboard motor that is operative to provide silencing for both the above the water and the below the water exhaust gas discharges.

A type of silencing device which is particularly effective is known as a Helmholtz resonator. This type of resonator is particularly effective in reducing exhaust noises, but operates only at a predetermined frequency range depending upon its volume and the length and size of its tuning neck. It has been proposed to vary the volume of the chamber in order to achieve silencing over a wider range. However, this type of device only operates on the Helmholtz principle.

It is, therefore, a still further object of this invention to provide an improved Helmholtz resonator for the exhaust system of an internal combustion engine which will silence exhaust pulses by means of the Helmholtz principle and in addition by utilizing a variable volume chamber to dampen the pulsations, as aforedescribed.

In conjunction with the use of variable volume chambers for silencing exhaust gases the use of a flexible diaphragm is particularly advantageous. However, the use of flexible diaphragms and particularly those comprised of elastomeric materials is not normally thought to be suited for exhaust systems due to the inability of most elastomers to sustain high temperatures as are present in exhaust gases.

It is, therefore, a still further object of this invention to provide an improved arrangement for employing an elastic diaphragm for silencing the exhaust gases of an internal combustion engine and also a means for cooling the diaphragm.

In connection with certain types of exhaust systems, particularly those found in outboard motors, there is additionally a problem of generating resonance in the exhaust system when large resonant chambers are employed. Such large resonant chambers themselves have their external walls acting as sound generating media. It has, therefore, been proposed to provide some damping arrangement for the movement of such external walls.

In accordance with another feature of this invention, it is an object to provide an arrangement which will dampen the movement of the walls and also provide a damping effect to the pulsations of the exhaust gases.

SUMMARY OF THE INVENTION

This invention is adapted to be embodied in an exhaust system for silencing the exhaust gases from the internal combustion engine before discharge to the atmosphere comprising exhaust conduit means that convey exhaust gases from a combustion chamber of the engine to the atmosphere. In accordance with the invention, an elastomeric wall member is provided in communication with the conduit means. The elastomeric wall member is deformable by the pulsations in the exhaust gases for damping and silencing the pulsations.

In accordance with a further feature of the invention, the diaphragm is designed in combination with the exhaust conduit so that the exhaust gases impinge directly upon the diaphragm.

In accordance with a further feature of the invention, an arrangement is incorporated for providing water cooling of the diaphragm.

In accordance with a still further feature of the invention, the diaphragm also forms a portion of the a Helmholtz resonator so that the exhaust gases are silenced additionally by the Helmholtz principle.

In accordance with a yet further feature of the invention, the elastomeric member is also formed as a suspension device for a portion of the exhaust conduit for resiliently resisting movement of the exhaust system component.

All of the aforenoted features are also adapted to be particularly embodied in conjunction with the exhaust for an outboard motor. In accordance with one feature of the invention applying the aforenoted principles to an exhaust system for an outboard motor, the elastomeric wall member cooperates with the underwater high speed exhaust gas discharge of the outboard motor.

In accordance with a further feature of the invention as applied to outboard motors, the elastomeric member is positioned in such a way so that it will provide its silencing effect under both the high speed and low speed exhaust gas discharges of the motor.

BRIEF DESCRIPTIONS OF THE DRAWINGS

DETAILED DESCRIPTION OF THE PREFERRED EMBODIMENTS OF THE INVENTION

Embodiment of FIGS. 1 through 6

Figure 1:
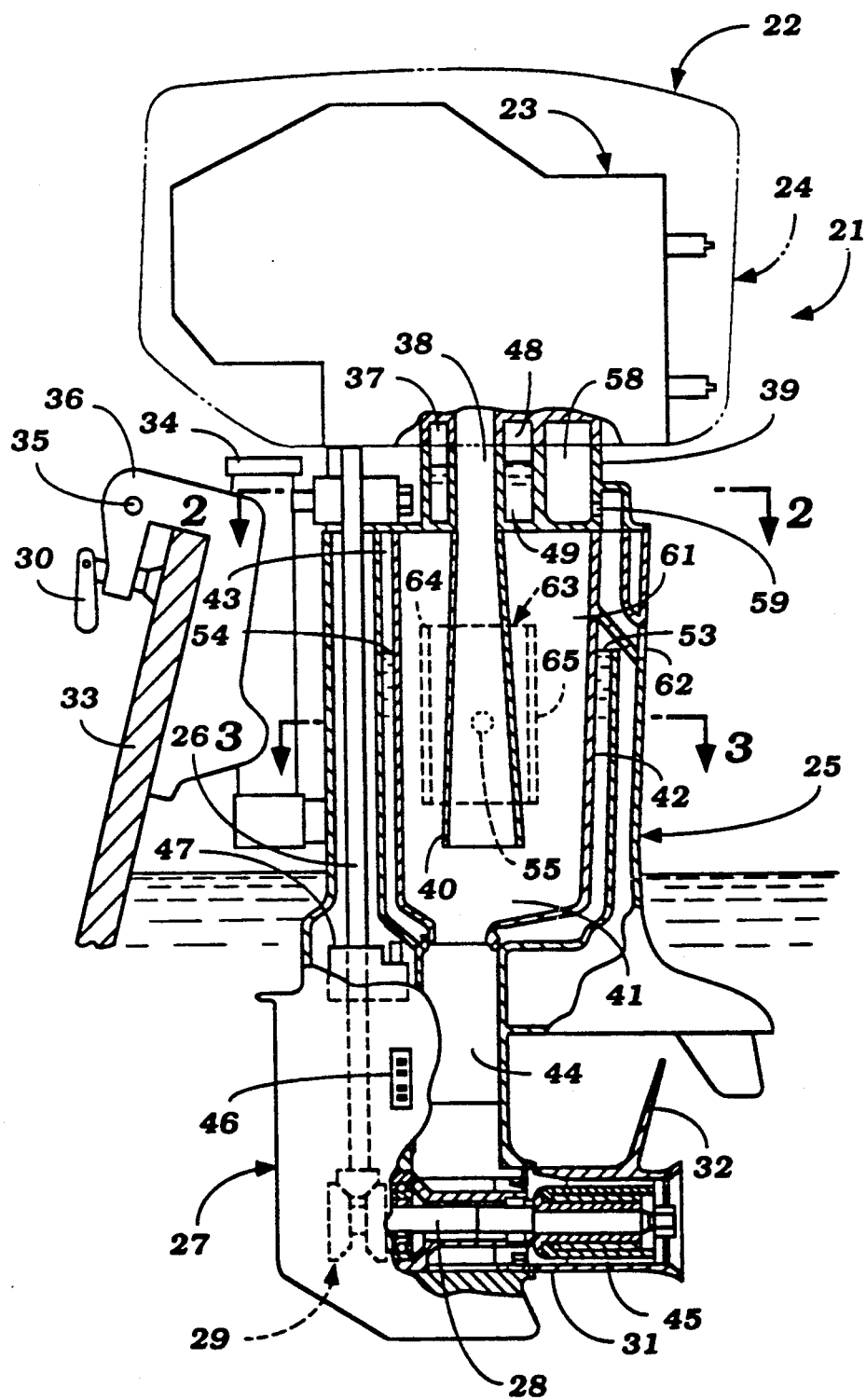
FIG. 1 is a side elevational view, with a portion broken away, of an outboard motor constructed in accordance with a first embodiment of the invention and as applied to the transom of a watercraft.
Figure 2:
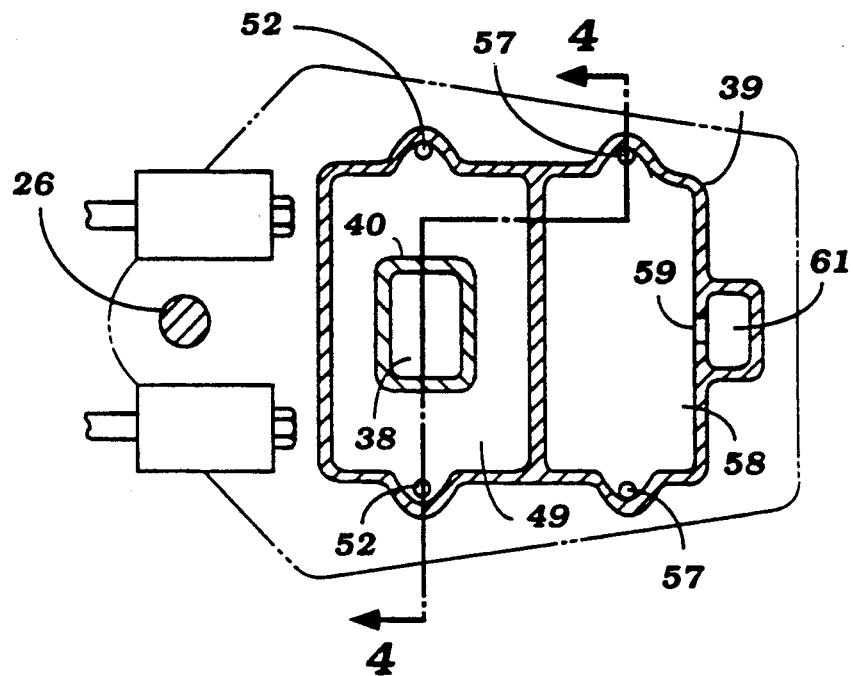
FIG. 2 is an enlarged cross sectional view taken along the line 2—2 of FIG. 1.
Figure 3:
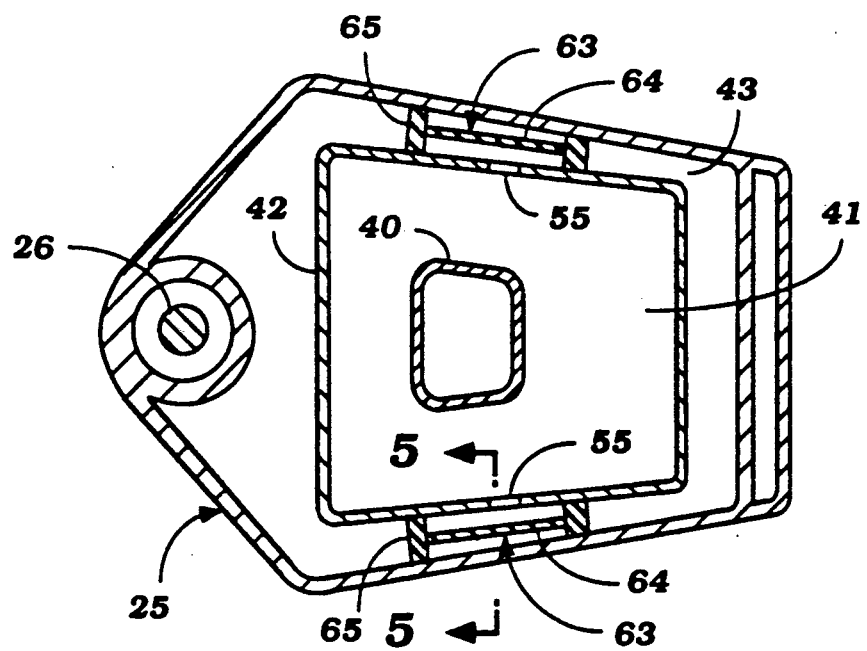
FIG. 3 is an enlarged cross sectional view taken along the line 3—3 of FIG. 1.
Figure 4:
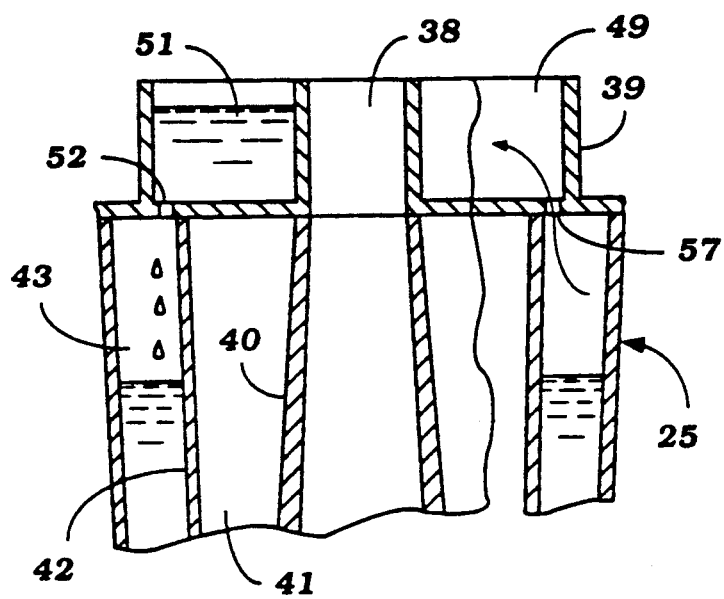
FIG. 4 is a cross sectional view taken along the line 4—4 of FIG. 2.

Referring first to this embodiment and initially primarily to FIG. 1, an outboard motor constructed in accordance with this invention is identified generally by the reference numeral 21. The outboard motor 21 is comprised of a power head 22 that consists of an internal combustion engine 23 and surrounding protective cowling 24. The engine 23 may be of any known type and is depicted as of the two cylinder, in line, two cycle, crankcase compression type.

A drive shaft housing 25 depends from the power head 22 and contains a drive shaft 26 that is rotatably coupled to the output shaft of the engine 23 in a known manner.

A lower unit 27 is supported at the lower end of the drive shaft housing 25 and rotatably journals a propeller shaft 28. The propeller shaft 28 is driven from the drive shaft 26 by means of a conventional forward, neutral, reverse bevel gear transmission 29. A propeller 31 having blades 32 is rotatably coupled to the propeller shaft 28 for propelling the associated watercraft, indicated partially at 33 in a known manner.

A steering shaft (not shown) is affixed to the drive shaft housing 25 and is rotatably journaled within a swivel bracket 34 for steering of the outboard motor about a generally vertically extending steering axis. The swivel bracket 34 is pivotally connected, as by means of a pivot pin 35, to a clamping bracket 36 that carries a clamping device 30 for affixing it to the transom of the watercraft 33 in a known manner.

The construction of the outboard motor 21 as thus far described may be considered to be conventional. For that reason, the details of the construction of the motor other than those already described are not necessary to understand the invention and reference may be had to any conventional outboard motor for them. An exhaust manifold communicates with the exhaust ports of the engine 23 and which has an exhaust gas discharge opening 37 that extends a generally downward direction. This exhaust discharge 37 communicates with an exhaust passage 38 formed in a spacer plate 39 that is positioned between the powerhead 22 and drive shaft housing 25. The exhaust passage 38 forms a part of an exhaust pipe 40 which depends into an expansion chamber 41 formed by an internal wall 42 supported within the interior of the drive shaft housing 25. It should be noted that a further chamber 43 is provided around the wall 42 and expansion chamber 41 internally of the drive shaft housing 25.

Exhaust gases are delivered to the expansion chamber 41 from the downward or lower end of the exhaust pipe 40 and there expand for silencing. The exhaust gases are then discharged into an exhaust gas passageway 44 formed in the lower unit 27 which communicates with a through the hub, under water, high speed exhaust gas discharge 45 formed in the propeller 31. This underwater discharge of the exhaust gases provides a silencing effect under high speed running.

The engine 23 is of the water cooled type cooling water for the engine 23 is introduced into the outboard motor 21 through an underwater inlet 46 that is formed in the lower unit 27. This cooling water is drawn through the inlet 46 by a coolant pump 47 that is driven by the drive shaft 26 at the interface between the drive shaft housing 25 and lower unit 27. The coolant is delivered to the engine cooling jacket in a suitable manner and then is discharged through a plurality of water discharges to a chamber 48 that is disposed above the spacer 39. These passages deliver coolant to a first cooling jacket 49 that is formed in the spacer plate 39 around the exhaust pipe 40 and specifically around its inlet portion 38. The coolant accumulates within the cooling jacket 49 to a level indicated by the line 51. The level is controlled by means of a plurality of discharge openings 52 that are formed in the lower end of the spacer plate 39 and which communicate with the chamber 43. A weir 53 is formed at one side of the wall 42 so that the water in the chamber 43 will accumulate to a level indicated at 54. The water which flows over the weir 53 will be discharged back into the body of water which the outboard motor 22 is operating a known manner.

As a result of the construction, the exhaust gases will be cooled by the coolant in the cooling jackets 49 and 43 and this cooling of the exhaust gases will assist in silencing and will also reduce the heat transfer to the outer portion of the drive shaft housing 25.

Only the underwater high speed exhaust gas discharge has thus far been described. In addition to the use of the cooling and the expansion chamber 41, the underwater discharge of the exhaust gases will assist in its silencing, as aforenoted. This is possible when operating at high speed and when the propeller 31 is only relatively shallowly submerged. However, when the outboard motor 21 is operating at low speeds, the watercraft 33 will assume a relatively low posture in the body of water in which it is operating and the underwater discharge 45 will relatively deeply submerged. This high water pressure coupled with the low exhaust gas pressure that it is present at low speed running makes it impossible for the exhaust gases to exit from the passage 45.

Therefore, there is provided a low speed exhaust gas discharge path that is formed in part by discharge openings 55 that are formed in the sides of the wall 42 of the expansion chamber 41. These discharge openings 55 are positioned at a level below the water level 54 defined by the weir 53 for purposes to be noted. The openings 55 communicate, in a manner to be described, with a chamber formed in the portion of the chamber 43 above the water level 54. Hence, there is formed a first expansion chamber which is designated as the chamber 56 in FIG. 6, which is the schematic view of the exhaust system. The chamber 56 is, as has been noted, defined above the water level 54 in the chamber 43.

The exhaust gases flow from the expansion chamber 56 upwardly through exhaust gas passages 57 formed in the lower surface of the spacer plate to communicate with a further expansion chamber 58 formed in the spacer plate 39 and by a lower cavity of the engine 23. These exhaust gases exit from the expansion chamber 58 through a discharge opening 59 to a discharge passage and further expansion chamber 61 that is formed within the spacer plate 39 and drive shaft housing 25. The expansion chamber and exhaust gas passage 61 communicates with an above the water exhaust gas discharge 62 that is formed in the drive shaft housing 25 above the water level under all running conditions.

It should be readily apparent that the described exhaust system provides effective silencing of the exhaust gases before their discharged to the atmosphere either through the high speed underwater exhaust gas discharge 45 or the low speed above the water exhaust gas discharge 62. This silencing is achieved by the cooling of the exhaust gases by the water chambers 49 and 43 as well as the successive flow of the exhaust gases through several restrictions and expansions. However, in accordance with the invention a still further exhaust silencing device is provided which will provide additional silencing for the exhaust gases by damping the pulsations in them. In addition, the construction is such that an elastic arrangement is incorporated between the wall 42 of the expansion chamber 41 and the inner surface of the outer wall of the drive shaft housing 25. This elastic arrangement provides a silencing effect and reduces the transmission of noises in the manner as described in U.S. Pat. No. 4,723,926, entitled "Non-Vibrating Structure of an Outboard Motor" issued Feb. 9, 1988 and assigned to the assignee of this application.

In accordance with this feature of the invention, a pair of elastic members, indicated generally by the reference numeral 63 are disposed between opposite side walls of the member 42 and the parallel or adjacent inner surfaces of the drive shaft housing 25. The elastic members 63 are formed from an elastomeric material and have a tranversely extending diaphragm portion 64 that is disposed in confronting a relationship with the exhaust gas opening 55. The diaphragm portion 64 extends a substantial vertical height relative to the opening 55 so that the exhaust gases may impinge on the full surface of the diaphragm 64.

At the ends, the diaphragm 64 are provided with bridging sections 65 so that the members 63 have a generally H shaped cross section. The bridging members 65 extend between and contact the outer surface of the housing 42 and the inner surface of the drive shaft housing 25 so as to provide the aforenoted vibration damping characteristics between these two members.

In operation, the exhaust pulsations will be transmitted through the openings 55 to cause resilient deformation of the diaphragm 64 regardless of whether the exhaust gases are flowing through the high speed or low speed discharges 45 or 62, respectively. As a result, there will be further sound deadening. In addition, since the elastic members 63 are positioned at least in substantial part below the water level 54, the elastic member will be effectively cooled and can enjoy a long life without damage from the exhaust gases.

Figure 7:
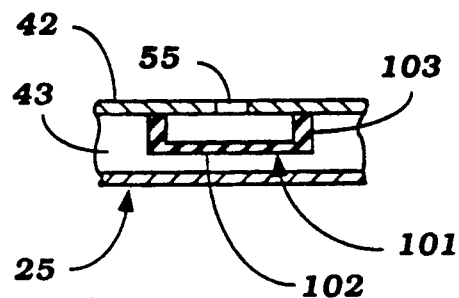
FIG. 7 is a cross sectional view, in part similar to FIG. 3, showing another embodiment of the invention.

Embodiment of FIG. 7

Referring now to FIG. 7, this embodiment is basically the same as the same as the embodiment of FIGS. 1 through 6. Only the configuration of the elastic members is different and in this embodiment those elastic members have been identified by the reference numeral 101. The elastic members 101 have a diaphragm portion 102 which, like the embodiment of the FIGS. 1 through 6, extends across the opening 55 and in a substantial vertical distance relative to it. The diaphragm 102 is connected to the wall 42 by a pair of bridging member 103. The bridging members 103 and diaphragm member 102 only extend partially and thus the upper and lower ends are open so that exhaust gases may flow through the opening 55 into the water jacket 43. Thus, the exhaust gases may pass through the low speed gas discharge 102 under slow speed running. Also, like the embodiment of FIGS. 1 through 6, the device will provide damping under both high and low speed exhaust gas discharge due to the flexure of the diaphragm 102. This embodiment, however, does not provide vibration damping between the member 42 and the drive shaft housing 25. However, disassembly is facilitated since the elastic member 101 can be removed along with the housing member 42.

Figure 8:
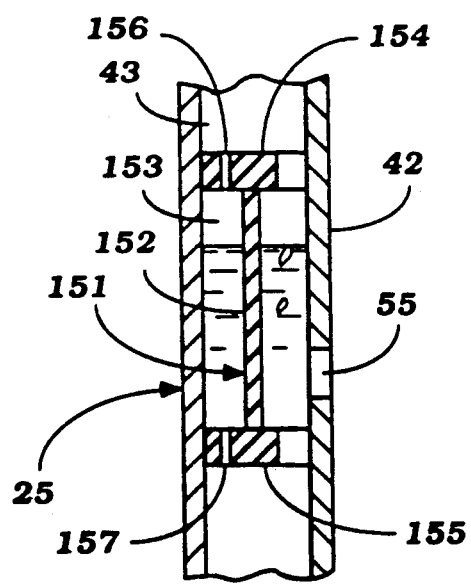
FIG. 8 is a cross sectional view, in part similar to FIG. 5, showing a still further embodiment of the invention.

Embodiment of FIG. 8

Figure 5:
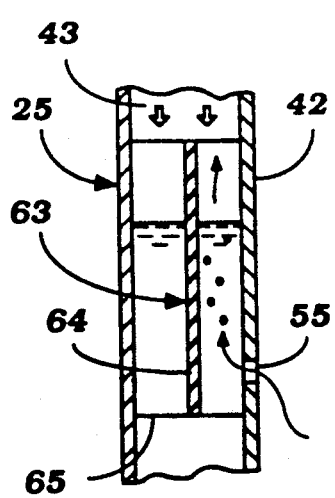
FIG. 5 is a cross sectional view taken along the line 5—5 of FIG. 3.
Figure 6:
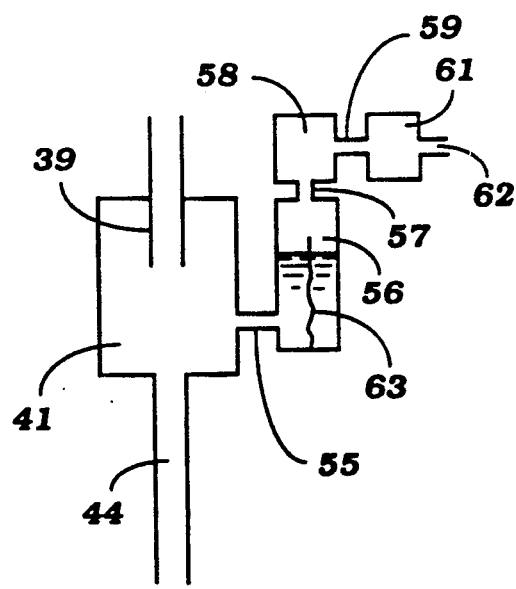
FIG. 6 is a schematic view showing the exhaust system of the embodiment of FIGS. 1 through 5.

The embodiment of FIG. 8 is generally similar to the embodiments of FIGS. 1 through 6 and of FIG. 7. This embodiment differs from those previously described embodiments only in the configuration of the elastomeric member and associated diaphragm, which is indicated by the reference numeral 151 in this embodiment. In all other regards, the embodiment is the same as the previously described embodiments and for that reason only a cross sectional view, taken along a plane similar to the plane of FIG. 5, is believed to be necessary to understand the construction and operation of this embodiment. Where the components of this embodiment are the same as those of the previously described embodiments, they have been identified by the same reference numeral.

In this embodiment, the elastomeric member 151 is formed with an integral diaphragm 152 that is disposed in confronting relationship to the exhaust opening 155 and which extends substantial vertical and transverse directions relative to it so that all exhaust gases will impinge upon the diaphragm 152. This embodiment is also similar to the embodiment of FIGS. 1 through 6 in that the diaphragm 152 is connected to bridging members (not shown) that extend between the outer walls of the housing 42 and the inner walls of the drive shaft housing 25 to provide vibration damping as aforedescribed.

However, there is provided a further chamber 153 behind the side of the diaphragm 152 that confronts the opening 55. The chamber 153 is generally closed by means of an upper wall 154 and a lower wall 155. The walls 154 and 155 have respective upper and lower openings 156 and 157 that communicate with the air space above the wall 154 and the water below the wall 155, respectively. The size of the openings 156 and 157 will control the air and water flow to and from the chamber 153 and hence affect changes in the rigidity of the diaphragm 152. These rigidity changes may be altered upon design so as to provide the desired degree of pulsation damping, as should be readily apparent. In all other regards, this embodiment operates as the previously described embodiments.

Figure 9:
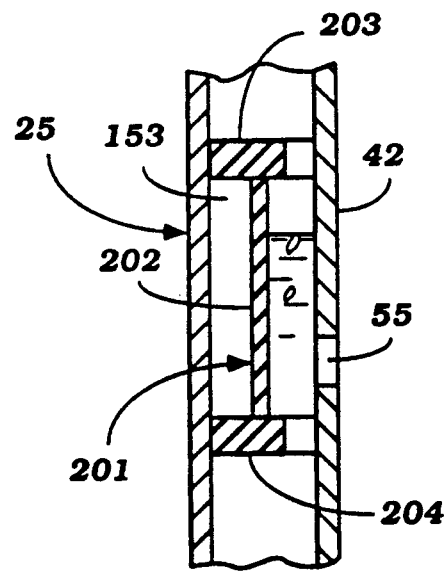
FIG. 9 is a cross sectional view, in part similar to FIGS. 5 and 8, showing yet another embodiment of the invention.

Embodiment of FIG. 9

FIG. 9 shows another embodiment of the invention which is generally similar to the embodiment of FIGS. 1 through 6, 7 and 8 and which differs from those embodiments only in the shape of the elastomeric member, which is indicated generally in this embodiment by the reference numeral 201. In this embodiment, the elastomeric member 201 includes a diaphragm 202 that is in confronting a relationship to the exhaust gas openings 55 in the wall 42. This embodiment differs from the embodiment of FIG. 8 in that the chamber 153 is completely sealed by upper and lower walls 203 and 204 that are connected to the bridging sidewalls. As a result, the chamber 103 is an air chamber that acts to control the resilience of the diaphragm 204 and control the pulsation damping, as should be readily apparent from the foregoing description.

Figure 10:
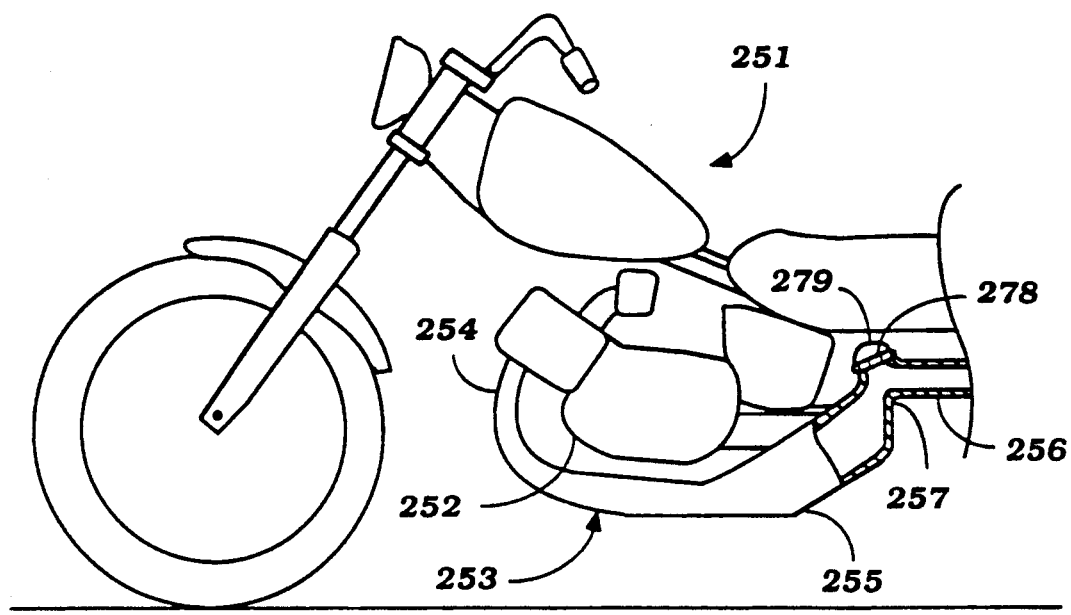
FIG. 10 is a partial side elevational view of a motorcycle, with a portion broken away, showing yet another embodiment of the invention.

Embodiment of FIG. 10

In the embodiments as thus far described, the invention has been disclosed in conjunction with outboard motors. However, certain facets of the invention can be employed in connection with exhaust systems for internal combustion engines in other environments and such an arrangement is shown in FIG. 10, wherein a motorcycle having an exhaust system constructed in accordance with this embodiment is identified generally by the reference numeral 251.

The motorcycle 251 is shown only partially, since as the invention is directed primarily to the exhaust system, and includes an internal combustion engine 252 which may be of any known type. The engine 252 includes an exhaust system indicated generally by the reference numeral 253 that includes a plurality of exhaust pipes 254 that extend from the exhaust ports of the engine to a combined collector section 255. The collector section 255 discharges to a tail pipe 256 in which a muffler (not shown) may be incorporated. An elbow, indicated generally by the reference numeral 257 is formed at the juncture between the collector section 255 and the tail pipe 256.

In accordance with the invention, an elastomeric diaphragm 278 extends across an opening formed in the elbow section 257 at an area where the exhaust gases will impinge upon it. The diaphragm 278 is formed with cooling fins 279 which extend into the air path so as to cool the diaphragm 278. In addition, the cooling ribs 279 will add some rigidity to the diaphragm so as to control its action. As with the previously described embodiments, the diaphragm 278 will deflect under the exertion of exhaust gas pulses to provide dampening and silencing.

Figure 11:
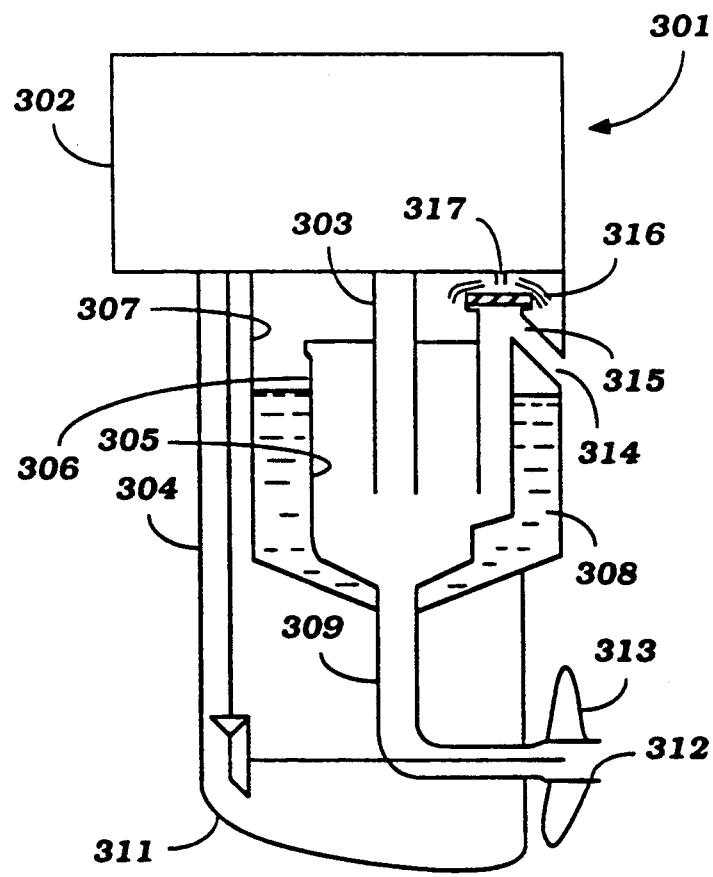
FIG. 11 is a partially schematic side elevational view, with portions shown in cross section, of an outboard motor constructed in accordance with yet another embodiment of the invention.

Embodiment of FIG. 11

FIG. 11 illustrates another embodiment of the invention as applied to an outboard motor, indicated generally by the reference numeral 301. The outboard motor 301 is depicted in a schematic fashion and includes a powerhead 302 having an engine that discharges its exhaust gases through an exhaust pipe 303. The exhaust pipe 303 depends into the drive shaft housing 304 and specifically into an expansion chamber 305 formed by an internal wall 306. The wall 306 is spaced inwardly from a further wall 307 so as to define watercooling jacket 308.

Exhaust gases are delivered to the atmosphere from the expansion chamber 305 through a discharge passageway 309 that extends through a lower unit 311 and through an underwater through the hub exhaust discharge 312 formed in a propeller 313.

In addition, there is provided an above the water low speed exhaust gas discharge 314 that extends through the drive shaft housing 304 in an area above the normal water level. An exhaust conduit including an elbow section 315 interconnects the above the water discharge 314 with the expansion chamber 305.

An elastic diaphragm 316 extends across the elbow 315 in a position to be confronted by the exhaust gases and thus afford pulsation dampening.

For cooling purposes, the engine cooling jacket is formed with a discharge opening 317 that is disposed above the diaphragm 316 so as to cool it. The water that cools the diaphragm 316 also enters into the water chamber 308 so as to provide a coolant that surrounds the expansion chamber 305, as with the previously described embodiments.

Figure 12:
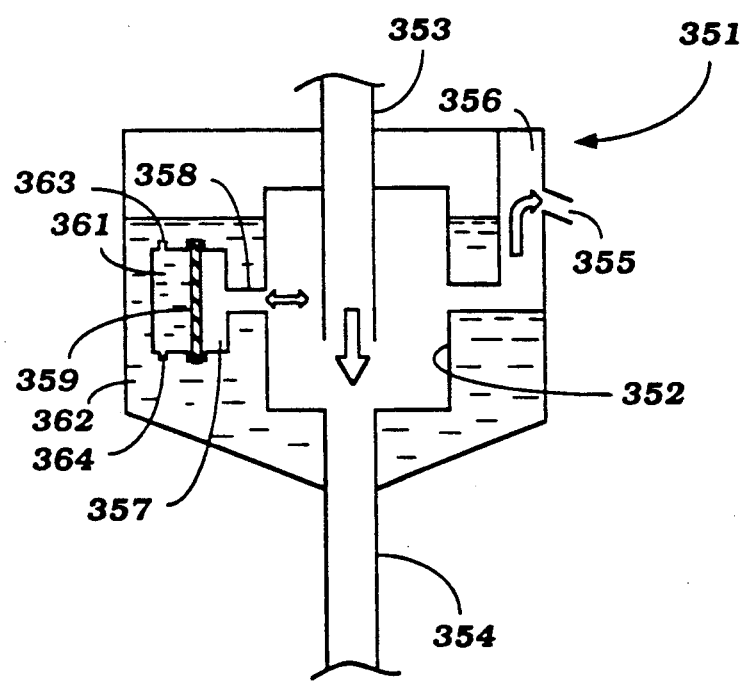
FIG. 12 is a partial cross sectional view in schematic fashion showing still another embodiment of the invention as applied to an outboard motor.

Embodiment of FIG. 12

FIG. 12 depicts schematically an exhaust system for an outboard motor constructed in accordance with a further embodiment of the invention, which is identified generally by the reference numeral 351. In this embodiment, only those components which are necessary to understand the construction and operation of the invention have been illustrated and the remaining components may be considered to be the same as those of the embodiment of FIGS. 1 through 6.

In this embodiment, the exhaust gases from the engine exhaust system are discharged downwardly into an expansion chamber 352 by an exhaust pipe 353. The expansion chamber 352 communicates with an underwater high speed exhaust gas discharge through a conduit 354 as in the previously described embodiment. In addition, there is provided an above the water low speed exhaust gas discharge 355 that communicates with the expansion chamber 352 in any known manner and which may include a silencing system including a further expansion chamber 356.

In accordance with this embodiment, there is provided a Helmholtz resonator that is comprised of an expansion chamber 357 that communicates with the expansion chamber 352 through a tuning neck 358. An expandable elastomeric diaphragm 359 extends across the chamber 357 and separates the chamber 357 from a water filled chamber 361. The chamber 361 cooperates with a water jacket 362 formed around the expansion chamber 352 through restricted openings 363 and 364 so as to provide pulsation damping in addition to the normal Helmholtz silencing. Also, the expansion and contraction of the diaphragm 356 will adjust the volume of the chamber 357 and further widen the band of tuning.

SUMMARY

From the foregoing description it should be readily apparent that a number of embodiments of the invention have been illustrated and described and each of which is effective to provide good silencing for exhaust gases through the use of an elastic diaphragm that dampens pulsations. In one of the embodiments, this elastic diaphragm forms a portion of a Helmholtz resonator and also is cooled by submerging in a cooling jacket of the engine or its exhaust system or by means of cooling air fins. Also, various arrangements are incorporated for adjusting or tuning the rigidity of the diaphragm. Furthermore, in some embodiment the diaphragm is suspended in such a way as to act as a vibration damping member between mechanical components of the exhaust system.

Although a number of embodiments of the invention have been illustrated and described, various changes and modifications may be made without departing from the spirit and scope of the invention as defined by the appended claims.

We claim:

1. In an outboard motor having a power head containing an internal combustion engine having an exhaust outlet, a drive shaft housing depending from said power head and an exhaust system for silencing the exhaust gases from said internal combustion engine to the atmosphere comprising exhaust conduit means depending into said drive shaft housing for conveying exhaust gases from said engine exhaust outlet to the atmosphere, the improvement comprising a non-metallic elastomeric wall member interposed between said conduit means and said drive shaft housing, an exhaust passage in said conduit means for transferring exhaust gas pulsations against said elastomeric wall member for damping and silencing said pulsations.

2. In an outboard motor as set forth in claim 1 wherein the exhaust conduit means terminates at least in part in an underwater exhaust gas discharge.

3. In an outboard motor as set forth in claim 2 wherein the exhaust conduit means further includes an above the water exhaust gas discharge for discharge of exhaust gases at slow speeds above the level of water in which the outboard motor is operating.

4. In an outboard motor as set forth in claim 2 wherein the elastomeric wall is at least partially submerged in cooling water of the outboard motor.

5. In an outboard motor as set forth in claim 4 wherein the exhaust conduit means further includes an above the water exhaust gas discharge for discharge of exhaust gases at slow speeds above the level of water in which the outboard motor is operating.

6. In an outboard motor as set forth in claim 1 wherein the engine is water cooled.

7. In an outboard motor as set forth in claim 6 wherein coolant from the engine is directed to the elastomeric wall for cooling the elastomeric wall.

8. In an outboard motor as set forth in claim 7 wherein the exhaust conduit means terminates at least in part in an underwater exhaust gas discharge.

9. In an outboard motor as set forth in claim 8 wherein the exhaust conduit means further includes an above the water exhaust gas discharge for discharge of exhaust gases at slow speeds above the level of water in which the outboard motor is operating.

* * * * *